US012483374B2

(12) United States Patent
Balraj et al.

(10) Patent No.: US 12,483,374 B2
(45) Date of Patent: Nov. 25, 2025

(54) INTERFERENCE CANCELLATION IN DYNAMIC SPECTRUM SHARING

(71) Applicant: Apple Inc., Cupertino, CA (US)

(72) Inventors: Rajarajan Balraj, Nuremberg (DE); Guang Xu, Munich (DE); Abhinav Gupta, Santa Clara, CA (US); Sami M. Almalfouh, San Jose, CA (US); Leilei Song, Sunnyvale, CA (US); Jia Tang, San Jose, CA (US); Xiaojun Ma, Munich (DE); Majdi Msallem, Munich (DE)

(73) Assignee: Apple Inc., Cupertino, CA (US)

( * ) Notice: Subject to any disclaimer, the term of this patent is extended or adjusted under 35 U.S.C. 154(b) by 537 days.

(21) Appl. No.: 17/847,093

(22) Filed: Jun. 22, 2022

(65) Prior Publication Data

US 2023/0032276 A1 Feb. 2, 2023

Related U.S. Application Data

(60) Provisional application No. 63/227,921, filed on Jul. 30, 2021.

(51) Int. Cl.
*H04L 5/00* (2006.01)

(52) U.S. Cl.
CPC ............ *H04L 5/0073* (2013.01); *H04L 5/001* (2013.01); *H04L 5/0098* (2013.01)

(58) Field of Classification Search
CPC ..... H04L 5/0072; H04L 5/001; H04L 5/0098; H04L 25/03006
See application file for complete search history.

(56) References Cited

U.S. PATENT DOCUMENTS

| 10,212,679 | B1 * | 2/2019 | Suresh | H04L 25/0224 |
| 2014/0313995 | A1 * | 10/2014 | Cyranka | H04L 5/0092 370/329 |
| 2016/0050534 | A1 * | 2/2016 | Lim | H04W 64/00 370/252 |
| 2018/0205581 | A1 * | 7/2018 | Kim | H04L 5/005 |
| 2018/0287760 | A1 | 10/2018 | Choi et al. | |
| 2019/0028243 | A1 * | 1/2019 | Kim | H04L 27/2655 |
| 2019/0182365 | A1 * | 6/2019 | Li | H04L 5/001 |
| 2019/0305989 | A1 * | 10/2019 | Yu | H04L 5/0007 |
| 2020/0112389 | A1 * | 4/2020 | Fakoorian | H04L 1/1607 |
| 2022/0182844 | A1 * | 6/2022 | Park | H04L 5/0051 |
| 2022/0191842 | A1 * | 6/2022 | Dinan | H04W 16/32 |

(Continued)

FOREIGN PATENT DOCUMENTS

| EP | 2675212 A1 | 12/2013 |
| EP | 4009551 A1 | 6/2022 |
| KR | 20210018997 A * | 2/2021 |

OTHER PUBLICATIONS

Scope Update for Rel-17 NR Demodulation Performance Wi: CRS-IM for LTE/NR DSS, RP-202659, 3GPP TSG-RAN Meeting #90-e, Dec. 7-11, 2020, 5 pages.

(Continued)

*Primary Examiner* — Parth Patel
(74) *Attorney, Agent, or Firm* — Kilpatrick Townsend & Stockton LLP

(57) ABSTRACT

The present application relates to devices and components including apparatus, systems, and methods for canceling reference signal interference in dynamic spectrum sharing networks.

18 Claims, 10 Drawing Sheets

(56) References Cited

U.S. PATENT DOCUMENTS

| | | | |
|---|---|---|---|
| 2022/0225358 A1* | 7/2022 | Hong | H04W 72/0446 |
| 2023/0032276 A1* | 2/2023 | Balraj | H04L 5/0098 |
| 2023/0180263 A1* | 6/2023 | Liu | H04W 72/0453 |
| | | | 370/329 |
| 2024/0196198 A1* | 6/2024 | Wu | H04J 11/005 |

OTHER PUBLICATIONS

WF on CRS Interference Handling in Scenarios with Overlapping Spectrum for LTE and NR, R4-2108662, 3GPP TSG-RAN WG4 Meeting #99e, May 19-27, 2021, 22 pages.

European Patent Application No. 22180993.2, Partial European Search Report, Dec. 21, 2022, 16 pages.

3rd Generation Partnership Project; Technical Specification Group Radio Access Network; NR; Physical channels and modulation (Release 16), 3GPP TS 38.211 V16.6.0, Jun. 2021, 134 pages.

3rd Generation Partnership Project; Technical Specification Group Radio Access Network; Evolved Universal Terrestrial Radio Access (E-UTRA); Physical channels and modulation (Release 16), 3GPP TS 36.211 V16.6.0, Jun. 2021, 249 pages.

RAN4 CRs to Even further enhanced MTC for LTE, RP-182365, 3GPP TSG-RAN Meeting #82, Dec. 10-13, 2018, 197 pages.

Discussion on NR-LTE Co-existence, R1-1701618, 3GPP TSG RAN WG1 Meeting #88, Feb. 13-17, 2017, 11 pages.

European Patent Application No. 22180993.2, Extended European Search Report, Mailed on Mar. 21, 2023, 14 pages.

\* cited by examiner

INTERFERENCE CANCELLATION IN DYNAMIC SPECTRUM SHARING

CROSS-REFERENCE TO RELATED APPLICATION

This application claims the benefit of U.S. Provisional Patent Application No. 63/227,921, filed on Jul. 30, 2021, which is herein incorporated by reference in its entirety for all purposes.

BACKGROUND

Dynamic spectrum sharing (DSS) has been introduced in Third Generation Partnership Project (3GPP) Fifth Generation (5G) New Radio (NR) to share spectrum between Long Term Evolution (LTE) and NR cells. The DSS framework allows the NR cell to rate match around LTE reference signals that would otherwise cause strong interference and compromise spectral efficiencies.

DETAILED DESCRIPTION

Figure 1:
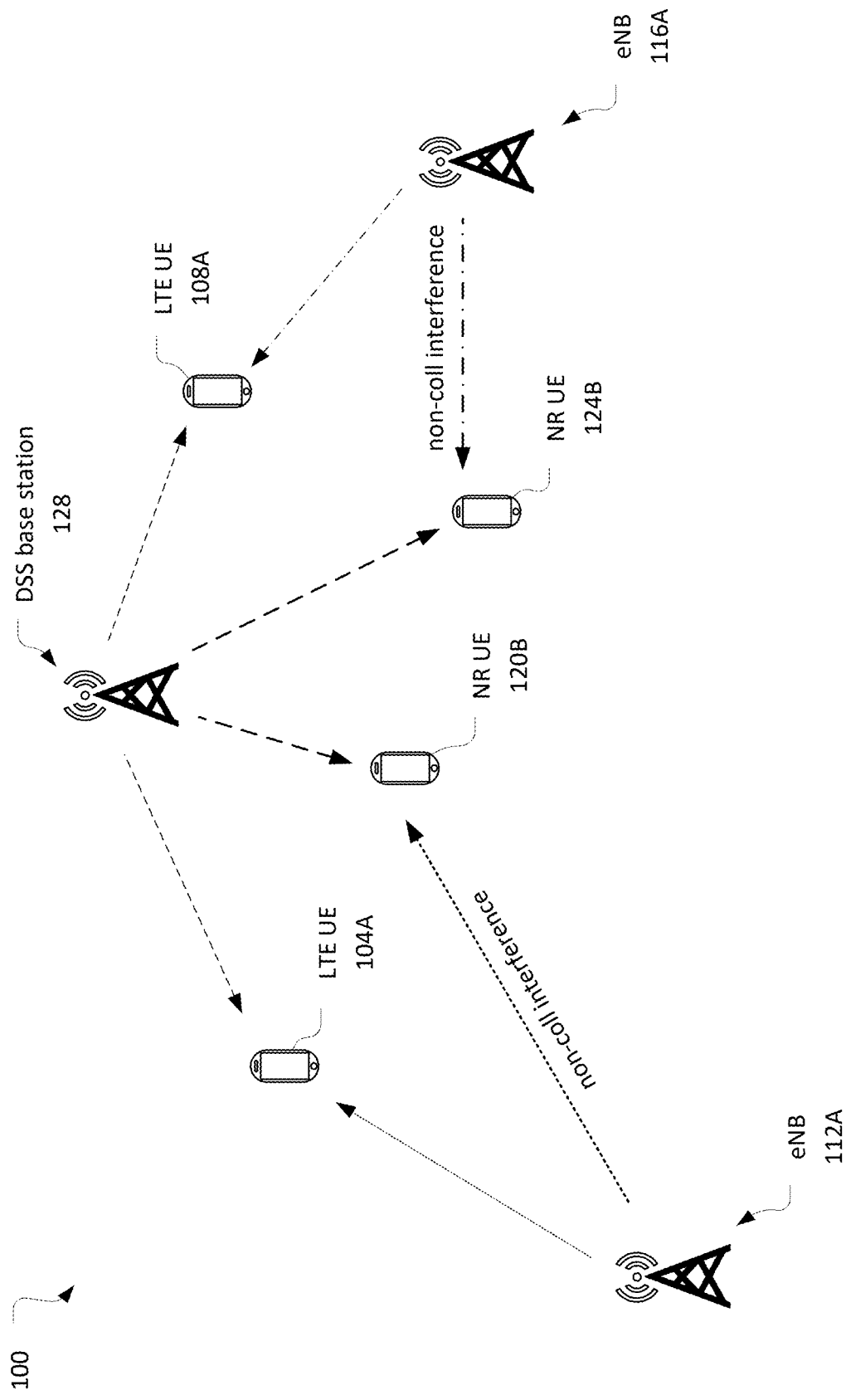
FIG. 1 illustrates a cellular system in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application-specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a cellular system 100 in accordance with some aspects. The cellular system 100 may include a first set of devices designed to communicate using LTE radio access technologies and a second set of devices designed to communicate using NR radio access technologies.

The LTE devices may include LTE user equipment (UE) 104A, LTE UE 108A, evolved node B (eNB) 112A, and eNB 116A. The NR devices may include NR UE 120B and NR UE 124B. The cellular system 100 may further include a DSS base station 128 that may be capable of operating as an eNB to provide LTE cells or a gNB to provide NR cells.

In LTE cells, cell-specific reference signals (CRSs) may be transmitted on the downlink to facilitate channel quality information (CQI) reporting, demodulation, cell (re)selection, and handover operations. CRS interference from CRSs transmitted in the LTE serving cells provided by the DSS base station 128 may be effectively mitigated by the DSS base station 128. This may be done by rate matching resource element (RE) tones of the NR cells corresponding to the CRS. CRS interference from colliding neighbor cells may also be mitigated in this manner as the CRSs will be on the same REs as the serving cell CRSs.

The eNB 112A and eNB 116A may be non-colliding neighbors. Thus, CRSs transmitted by eNB 112A and eNB 116A may cause non-colliding interference on the REs of the NR cells. This interference may limit system throughput or capacity. It may be possible to rate match RE tones of the NR cell corresponding to CRS of the non-colliding neighbors. However, this may cause additional overhead as physical downlink shared channel (PDSCH) transmissions may not be allowed on some OFDM symbols that correspond to the CRSs of the non-colliding neighbors.

Embodiments of the present disclosure describe non-collider CRS interference cancellation for NR cells to mitigate the LTE-CRS interference. As described herein, cancellation of CRS interference may include complete or partial cancellation of interference caused by CRS.

Differences between downlink transmissions on NR and LTE cells may be addressed to effectively cancel LTE CRS interference on NR cells. These differences may relate to differences in using a direct-current (DC) subcarrier and differences in OFDM modulation. Embodiments of this disclosure account for these differences in at least three aspects.

A first aspect of the disclosure includes CRS extraction and cancellation. Briefly, CRS reference symbol extraction and insertion of data REs after cancellation may be performed by accounting for a DC subcarrier.

A second aspect of the disclosure includes phase compensation for neighbor cell channel estimation. Briefly, phase compensation for LTE CRS may be performed during channel estimation due to different OFDM symbol generation between LTE and NR.

A third aspect of the disclosure includes neighbor cell frequency offset estimation of CRS. Briefly, neighbor cell frequency offset estimation may be performed on CRS under DSS with different OFDM symbol generation between LTE and NR.

These and other aspects of the disclosure will be described in further detail.

Figure 2:
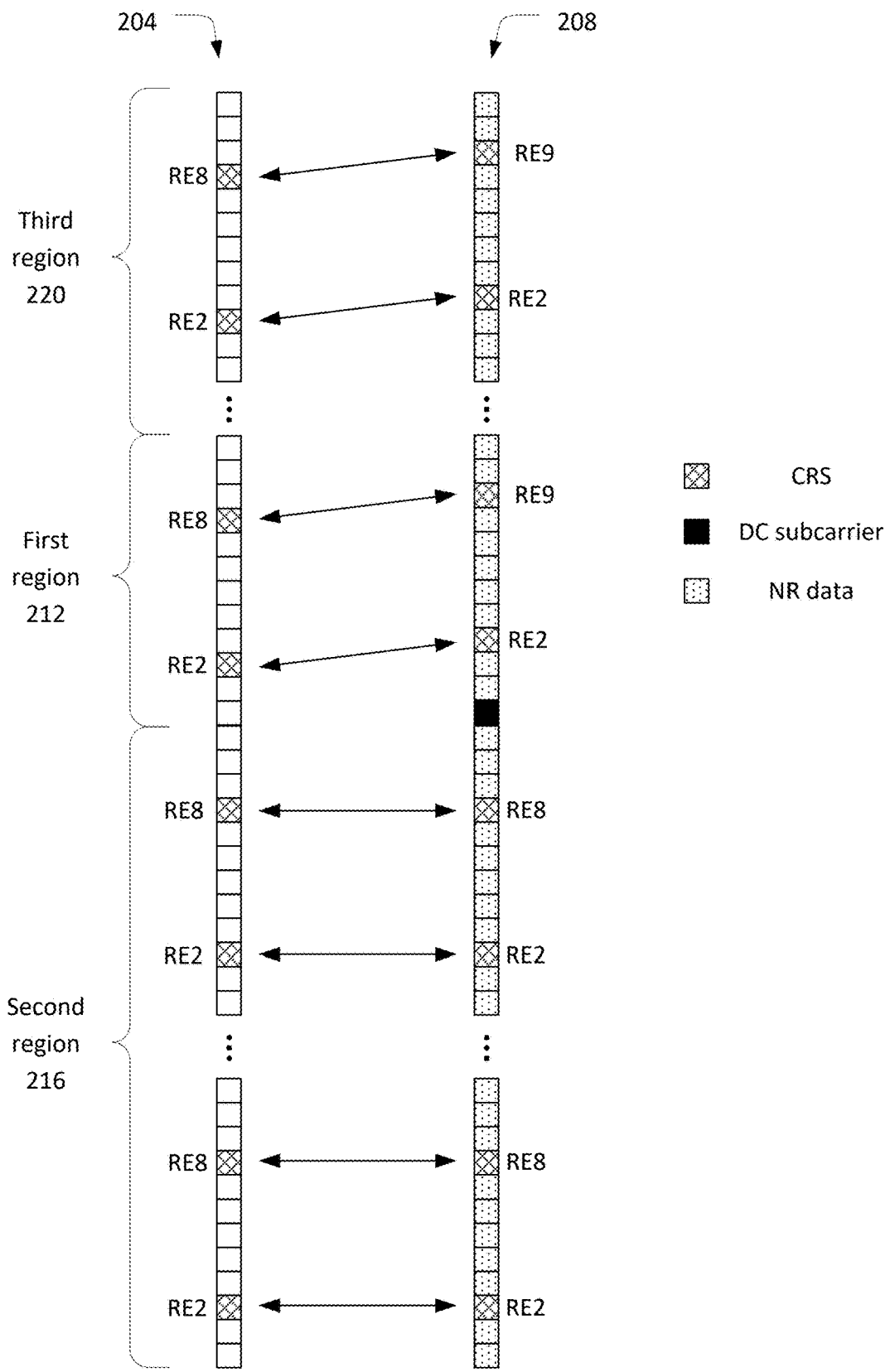
FIG. 2 illustrates a pair of orthogonal frequency division multiplexing (OFDM) symbols in accordance with some embodiments.

FIG. 2 illustrates a pair of orthogonal frequency division multiplexing (OFDM) symbols in accordance with some embodiments. OFDM symbol 204 may represent a symbol in a non-colliding LTE cell. OFDM symbol 208 may represent a symbol in an NR cell.

The CRS in the OFDM symbol 204 may be mapped to resource elements based on a CRS shift that is determined based on a cell ID of the LTE cell. For example, the CRS shift ($CRS_{shift}$) may be defined as follows:

$$CRS_{shift} = cell_{ID} \text{ modulus } 6,$$

where $cell_{ID}$ is the identity of the LTE cell. The OFDM symbol 204 is shown with a CRS shift of two. If the first resource element at the low end of the carrier bandwidth is RE0, shifting the CRS sequence by two will result in the CRSs being located in third resource element (RE2) and the ninth resource element (RE8) of a given resource block.

The OFDM symbol 208 is shown with the CRS transmitted in the LTE cell superimposed over selected resource elements. The mapping of the resource elements carrying the CRSs in the OFDM symbol 204 to the resource elements of the OFDM symbol 208 may be based on a DC carrier in the OFDM symbol 208.

In LTE, the DC subcarrier is reserved and not used for data transmission. In NR, the DC subcarrier is used for data transmission. Therefore, the DC subcarrier is shown in OFDM symbol 208, but is not shown in OFDM symbol 204. Because of this discrepancy, carrier spacing of CRS from LTE interference is not a regular grid of six resource elements when mapping onto the NR resource grid.

Embodiments account for the DC impact during CRS descrambling of interference. This may be done by segmenting the resource grid into different regions in which the extraction of the CRS is treated separately.

A first region 212 may be defined to include resource elements of the resource block that includes the DC subcarrier. A second region 216 may be defined to include resource blocks having frequencies below the frequencies of the first region. A third region 220 may be defined to include resource blocks having frequencies above the first region.

In the second region 216, the CRSs from resource elements of the OFDM symbol 204 may be mapped to corresponding resource elements of the OFDM symbol 208. For example, CRSs from RE2 and RE8 of the OFDM symbol 204 may be respectively mapped to RE2 and RE8 of the OFDM symbol 208.

In the third region 220, the CRSs from resource elements of the OFDM symbol 204 may be mapped to resource elements of the OFDM symbol 208 that are offset by one. For example, CRSs from RE2 and RE8 of the OFDM symbol 204 may be respectively mapped to RE3 and RE9 of the OFDM symbol 208. This offset of one may account for the shifting from the presence of the DC subcarrier in OFDM symbol 208.

In the first region 212, resource elements below the DC subcarrier may be mapped as described above with respect to the second region 216, while resource elements above the DC subcarrier may be mapped as described above with respect to the third region 220. As shown in FIG. 2, all resource elements in the first region 212 are above the DC subcarrier. Thus, the CRSs from resource elements of the OFDM symbol 204 may be mapped to resource elements of the OFDM symbol 208 that are offset by one. For example, CRSs from RE2 and RE8 of the OFDM symbol 204 may be respectively mapped to RE3 and RE9 of the OFDM symbol 208.

Figure 3:
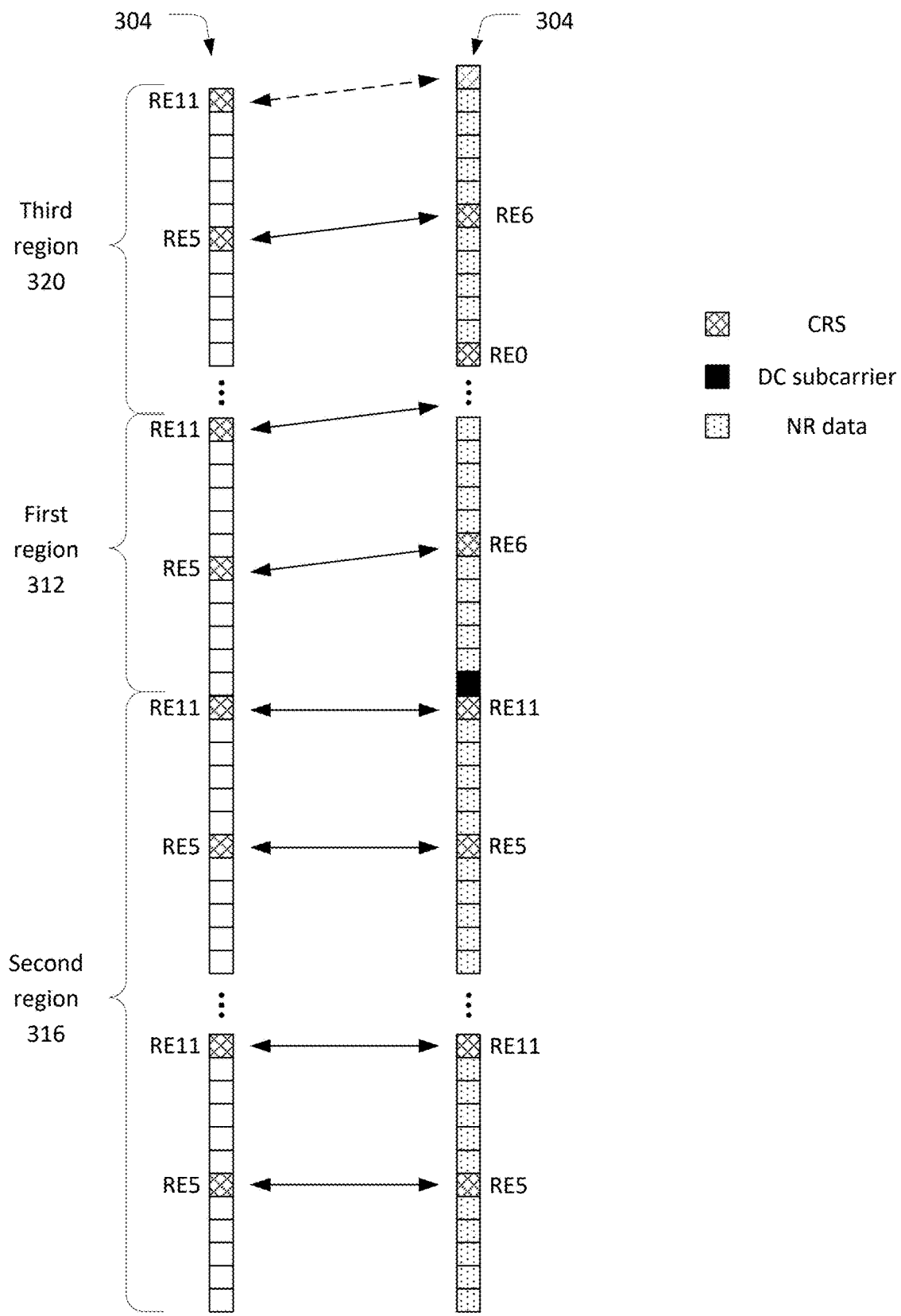
FIG. 3 illustrates another pair of OFDM symbols in accordance with some embodiments.

FIG. 3 illustrates a pair of OFDM symbols in accordance with some embodiments. OFDM symbol 304 may represent a symbol in a non-colliding LTE cell. OFDM symbol 308 may represent a symbol in an NR cell.

In this embodiment, the CRS in the OFDM symbol 304 may be mapped to resource elements based on a CRS shift of 5. Thus, the CRSs may be located in the sixth resource element (RE5) and the twelfth resource element (RE11) of a given resource block.

The mapping of the resource elements from the OFDM symbol 304 to OFDM symbol 308 may be similar to that described above. For example, in the second region 316, the CRSs from resource elements of the OFDM symbol 304 may be mapped to corresponding resource elements of the OFDM symbol 308. For example, CRSs from RE5 and RE11 of the OFDM symbol 304 may be respectively mapped to RE5 and RE11 of the OFDM symbol 308.

In the third region 320, the CRSs from resource elements of the OFDM symbol 304 may be mapped to resource elements of the OFDM symbol 308 that are offset by one. For example, CRSs from RE5 and RE11 of the OFDM symbol 304 may be respectively mapped to RE6 and RE0 of the OFDM symbol 208. The mapping from RE11 to RE0 may result in the CRS from resource block N of the LTE cell being mapped to resource block N+1 of the NR cell. This may result in one CRS RE not being able to be mapped to an RE in the OFDM symbol 304 as it may be outside of the carrier bandwidth of the NR cell. In some embodiments, a pseudo CRS resource element may be added to make up for the missing CRS RE in order to provide consistent signal processing.

In the first region 312, resource elements below the DC subcarrier may be mapped as described above with respect to the second region 316 and resource elements above the DC subcarrier may be mapped as described above with respect to the third region 220.

In both FIGS. 2 and 3, the carrier bandwidth of the LTE cell is shown as being equivalent to the carrier bandwidth of the NR cell. In other embodiments, the bandwidths may be different.

Figure 4:
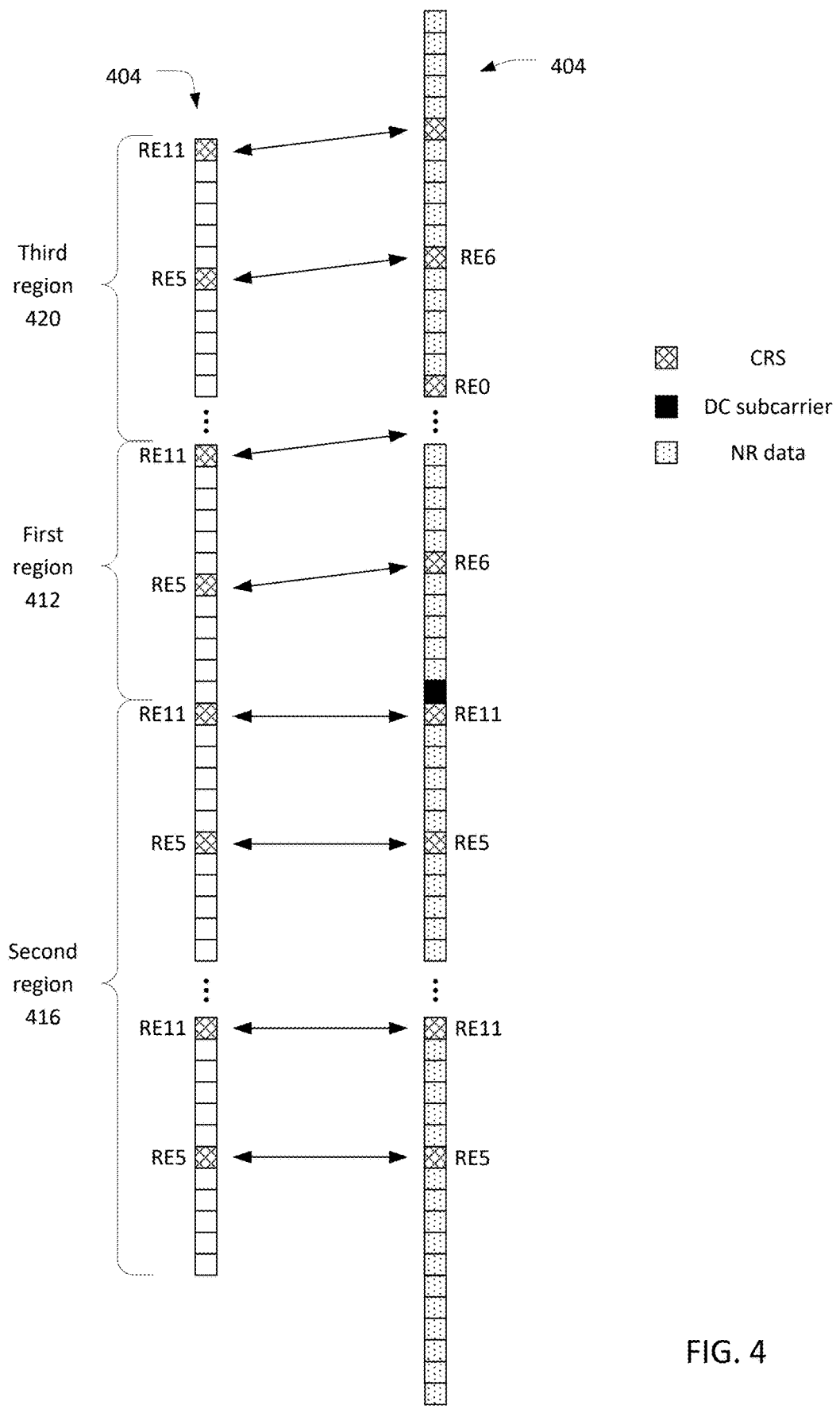
FIG. 4 illustrates another pair of OFDM symbols in accordance with some embodiments.

FIG. 4 illustrates a pair of OFDM symbols in situations in which the LTE and NR cells have different bandwidths in accordance with some embodiments. OFDM symbol 404 may represent a symbol in a non-colliding LTE cell with a first carrier bandwidth. OFDM symbol 408 may represent a symbol in an NR cell with a second carrier bandwidth that is greater than the first carrier bandwidth.

In this embodiment, the CRS shift may be five, similar to that discussed above with respect to FIG. 3. However, in this embodiment, the larger carrier bandwidth of the NR cell may allow the CRS RE11 of resource block N of the LTE cell to be mapped to CRS RE0 of resource block N+1 of the NR cell at the top of the carrier bandwidth. Thus, no pseudo CRS RE may be needed in this embodiment.

The mapping of REs to the NR bandwidth in the first region 412, second region 416, and third region 420 may be similar to that discussed above.

Figure 5:
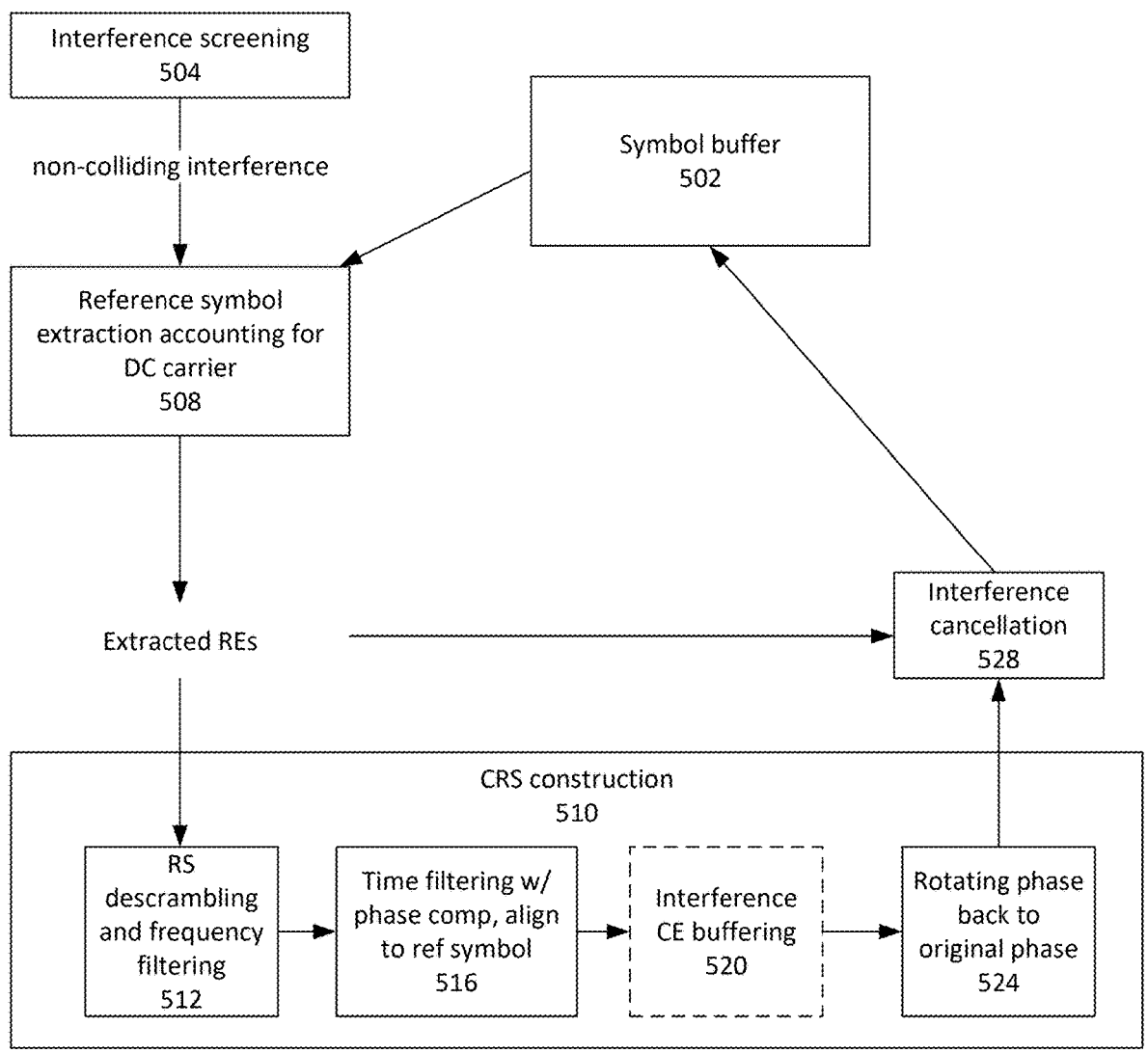
FIG. 5 illustrates an extraction and cancellation operation in accordance with some aspects.

FIG. 5 illustrates a CRS extraction and cancellation operation 500 in accordance with some embodiments.

The operation 500 may include, at 504, interference screening to identify sources of non-colliding interference. In some embodiments, the interference screening may include utilizing neighbor cell information provided by a serving cell to identify neighboring eNBs that may be transmitting CRSs that cause non-colliding interference.

The operation 500 may further include, at 508, reference symbol extraction accounting for the DC carrier. The reference symbol extraction may be performed on resource element information of an NR OFDM symbol from a symbol buffer 502. The NR OFDM symbol may be similar to those described above with respect to FIGS. 2-4. The reference symbol extraction may determine the CRS shift based on the cell identity of the identified interferer and may map the CRS REs of the LTE cell to the resource elements of the NR OFDM symbol based on a region-specific mapping as described herein.

The REs extracted at 508 may serve as a basis for CRS construction at 510. CRS construction may be performed to estimate an LTE channel, from a transmitted CRS, that interferes with the NR reference elements.

The CRS construction may include reference signal descrambling and frequency filtering at 512 to isolate the frequency components of the CRS. The output from 512 may include an RS descrambling output that may be stored in a least square (LS) channel estimate buffer, and a frequency direction filtering output that may be stored in a frequency domain (FD) channel estimate buffer. The signals in these buffers may not be phase corrected.

Following 512, CRS-interference cancellation (IC) time filtering may be performed for the LTE channel estimates.

NR OFDM symbols, as defined in section 5.4 of 3GPP TS 38.211 v16.6.0 (2021-06-30), and LTE OFDM symbols, as defined in 3GPP TS 36.211 v16.6.0 (2021-06-30), have different phases. For example, NR signals (other than physical random access channel (PRACH) signals and remote interference management (RIM)-reference signals (RSs)) after modulation and up-conversion to a carrier frequency are defined in 3GPP TS 38.211 as:

$$Re\{s_l^{(p,\mu)}(t) \cdot e^{j2\pi f_0(t - t_{start,l}^\mu - N_{CP,l}^\mu T_c)}\}, \text{ where}$$

$$t_{start,l}^\mu = \begin{cases} 0, & l = 0 \\ t_{start,l-1}^\mu + (N_u^\mu + N_{CP,l-1}^\mu) \cdot T_c, & \text{otherwise} \end{cases},$$

$$N_u^\mu = 2048\kappa \cdot 2^{-\mu}, \text{ and}$$

$$N_{CP,l}^\mu = \begin{cases} 512\kappa \cdot 2^{-\mu} & \text{extended cyclic prefix} \\ 144 \cdot 2^{-\mu} + 16\kappa & \text{normal cyclic prefix, } l = 0 \text{ or } l = 7 \cdot 2^\mu \\ 144\kappa \cdot 2^{-\mu} & \text{normal cyclic prefix, } l \neq 0 \text{ and } l \neq 7 \cdot 2^\mu \end{cases}$$

where $s_l^{(p,\mu)}(t)$ is the time-continuous signal on antenna port p and subcarrier spacing configuration μ for OFDM symbol l in a subframe, κ is the ratio between a $T_s$ (a basic time unit for LTE) and $T_c$ (a basic time unit for NR).

LTE OFDM symbols may be defined as $$Re\{s_l^{(p)}(t) \cdot e^{j2\pi f_0 t}\}.$$

where $s_l^{(p)}(t)$ is the time-continuous baseband signal for antenna port p and SC-FDMA/OFDM symbol l in a slot.

These differences may distort the phase for LTE CRS symbols from the interference cell as received by the NR UE. Phase correction may be employed to compensate the phase difference impact during CRS-IC time filtering for LTE channel estimates.

Briefly, the CRS-IC time filtering may include time filtering with phase compensation to align CRS symbols to a reference symbol at 516, then rotating the phase back to the original phase at 524. In some embodiments, this phase compensation for LTE CRS during time filtering may be performed using Kalman filtering.

Figure 6:
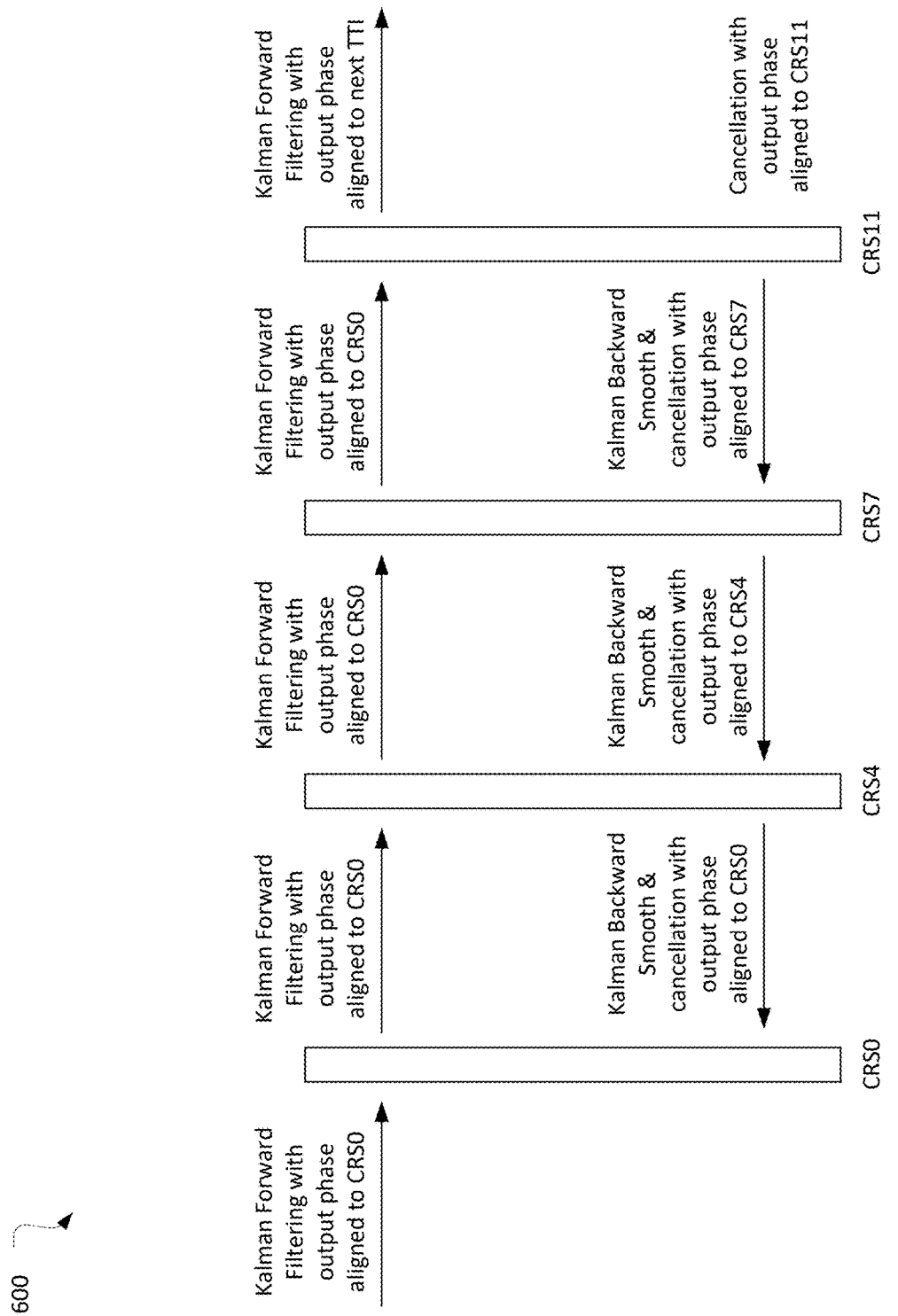
FIG. 6 illustrates a Kalman state buffer in accordance with some embodiments.

FIG. 6 illustrates operation of a Kalman state buffer in accordance with some embodiments.

During the Kalman forward filtering, the phase of each CRS symbol is aligned with a reference phase to facilitate coherent filtering. For CRS ports 0/1, the phases may be aligned with the phase of OFDM symbol 0. For CRS ports 2/3, the phases may be aligned with the phase of OFDM symbol 1. As shown, the Kalman Forward Filtering aligns the phases of CRS 4, CRS 7, and CRS 11 to CRS 0. The phase offset between CRS symbol 0/1 and other CRS symbols in a same transmit group (for example, transmit time interval (TTI)) may only need to be computed one time when connection is setup. A CRS symbol # (or CRS #) as used herein may refer to an OFDM symbol # that has CRS components.

After the Kalman forward filtering, and prior to CRS cancellation, a Kalman backward smooth and cancellation process is performed with the phase being rotated back to the original phase of the corresponding CRS OFDM symbol.

Time filtering methods other than Kalman filtering may be used in some embodiments. For example, a finite impulse response (FIR) filter may be used in some embodiments. The compensation method of using a FIR filter may be similar to the Kalman filter. With a FIR filter, the filtered CRS may be aligned to the same phase as a CRS symbol 0, while a phase of a descrambled raw CRS is kept in an interfering channel estimate (CE) buffer 520. The raw CRS data may be used to rotate the phase back to the original phase at 524.

Following the CRS construction 510, the process 500 may include interference cancellation at 528. The interference cancellation may include subtracting the constructed CRS from the extracted REs that include the CRS interference. Once the interference is canceled, the interference-free (or interference-reduced) data may be written back to the symbol buffer 502. The extraction pattern used to extract the REs may be used to write back the REs to the symbol buffer 502.

Figure 7:
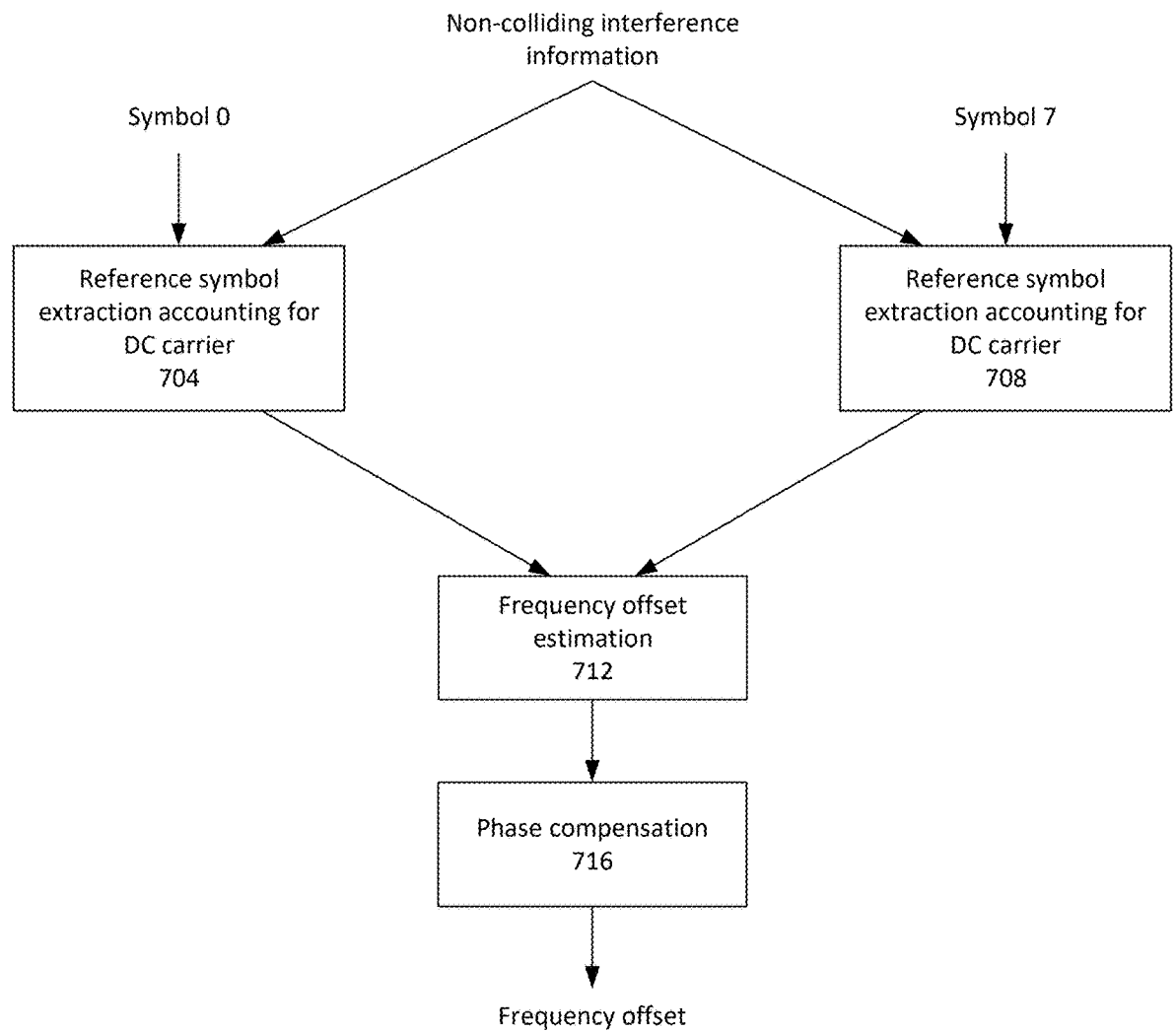
FIG. 7 illustrates a procedure for frequency offset estimation in accordance with some embodiments.

FIG. 7 provides a procedure 700 for frequency offset estimation in accordance with some embodiments. The frequency offset estimation for an interference cell may be desired to improve CRS-IC performance. In some embodiments, the frequency offset estimation may be computed based on a phase difference between two CRS symbols, for example, CRS 0 and CRS 7.

The procedure 700 may include, at 704, a reference symbol extraction accounting for DC carrier. Reference symbol extraction may include processes similar to those discussed above with respect to 508 and 512 of FIG. 5. The extracted reference symbol may be symbol 0, which includes components from the CRS of the interfering cell. The extraction of the reference symbol may be based on non-colliding interference information similar to that discussed above with respect to FIG. 5.

The procedure 700 may also include, at 708, another reference symbol extraction accounting for DC carrier. This extracted reference symbol may be symbol 7, which also includes components from the CRS of the interfering cell. The extraction of the reference symbol may be based on non-colliding interference information similar to that discussed above with respect to FIG. 5.

The procedure 700 may further include a frequency offset estimation at 712. The estimate of the frequency offset may be based on computing the phase difference between the reference symbols extracted at 704 and 708. The frequency offset estimated at 712 may estimate a frequency offset due to oscillator frequency differences between the UE and the eNB of the interfering cell.

The procedure 700 may further include a phase compensation at 716. The phase compensation at 716 may determine phase offset that exists for different CRS symbols of the interference cell received by the NR UE. This systemic phase offset may be caused due to NR OFDM symbol generation as described above. This phase offset caused by UE differences in symbol generation may be excluded from the previously estimated frequency offset at 716 in order to compensate for the systemic bias on the frequency offset estimation.

Figure 8:
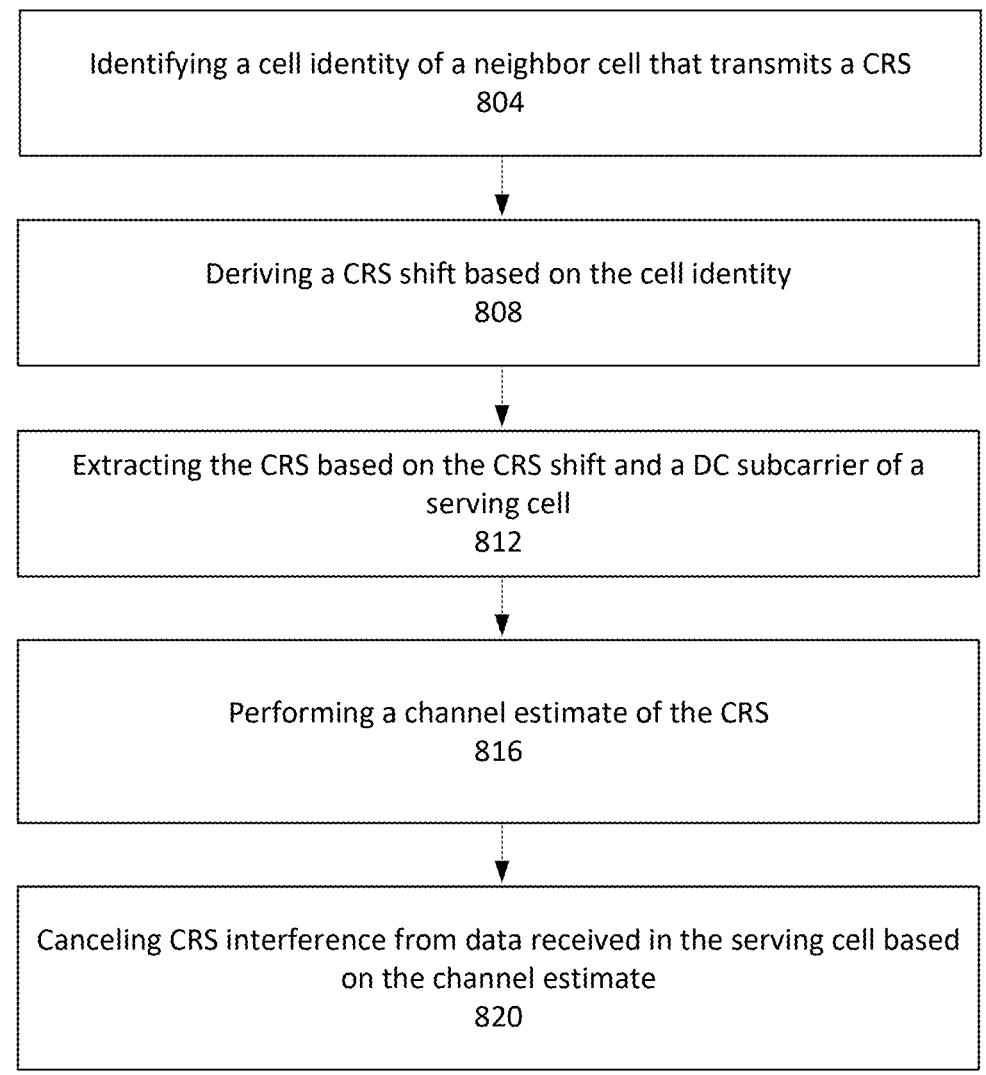
FIG. 8 illustrates an operational flow/algorithmic structure in accordance with some embodiments.

FIG. 8 illustrates an operation flow/algorithmic structure 800 in accordance with some aspects. The operation flow/algorithmic structure 800 may be performed or implemented by a UE such as, for example, NR UE 120B, NR UE 124B, or UE 1000; or components thereof, for example, baseband processor 1004A.

The operation flow/algorithmic structure 800 may include, at 804, identifying a cell identity of a neighbor cell that transmits a CRS. The cell identity may be identified based on a neighbor cell report provided to an NR UE by a gNB. The neighbor cell may be an LTE cell that provides non-colliding interference. For example, the gNB may not be rate matched around the CRS transmitted by the LTE and, resultantly, the CRS may be a potential source of interference.

The operation flow/algorithmic structure 800 may further include, at 808, deriving a CRS shift based on the cell identity. The CRS shift may be determined based on the cell ID modulus 6 as described above.

The operation flow/algorithmic structure 800 may further include, at 812, extracting the CRS based on the CRS shift and a DC subcarrier of a serving cell. The extraction of the CRS may be conducted based on the extraction pattern having a plurality of regions. A first region may be defined as a resource block that includes the DC subcarrier. A second region may be defined to include resource blocks having frequencies below the DC subcarrier. A third region may be defined as resource blocks having frequencies above the DC subcarrier.

The CRS from the neighbor cell may be mapped to resource elements of the serving cell based on the different regions. For example, CRS resource elements may be mapped to corresponding resource elements in the second region and may be mapped to resource elements offset by one from corresponding resource elements in the third region to account for the DC subcarrier. In the first region, CRS resource elements may be mapped to corresponding resource elements below the DC subcarrier (if any) and may be mapped to resource elements offset by one from corresponding resource elements above the DC subcarrier.

The operation flow/algorithmic structure 800 may further include, at 816, performing a channel estimate of the CRS. The channel estimate of the CRS may be performed by using time filtering with phase compensation to align a plurality of CRS symbols in a TTI to a reference symbol. Subsequently, the phase of the CRS symbols may be rotated back to the original phase. This may be done using a Kalman or FIR filter in some embodiments.

The operation flow/algorithmic structure 800 may further include, at 820, canceling the CRS interference from data received in the serving cell based on the channel estimate. The data may then be written back to a symbol buffer. The data may be written back to the symbol buffer based on the extraction pattern used to extract the CRS.

Figure 9:
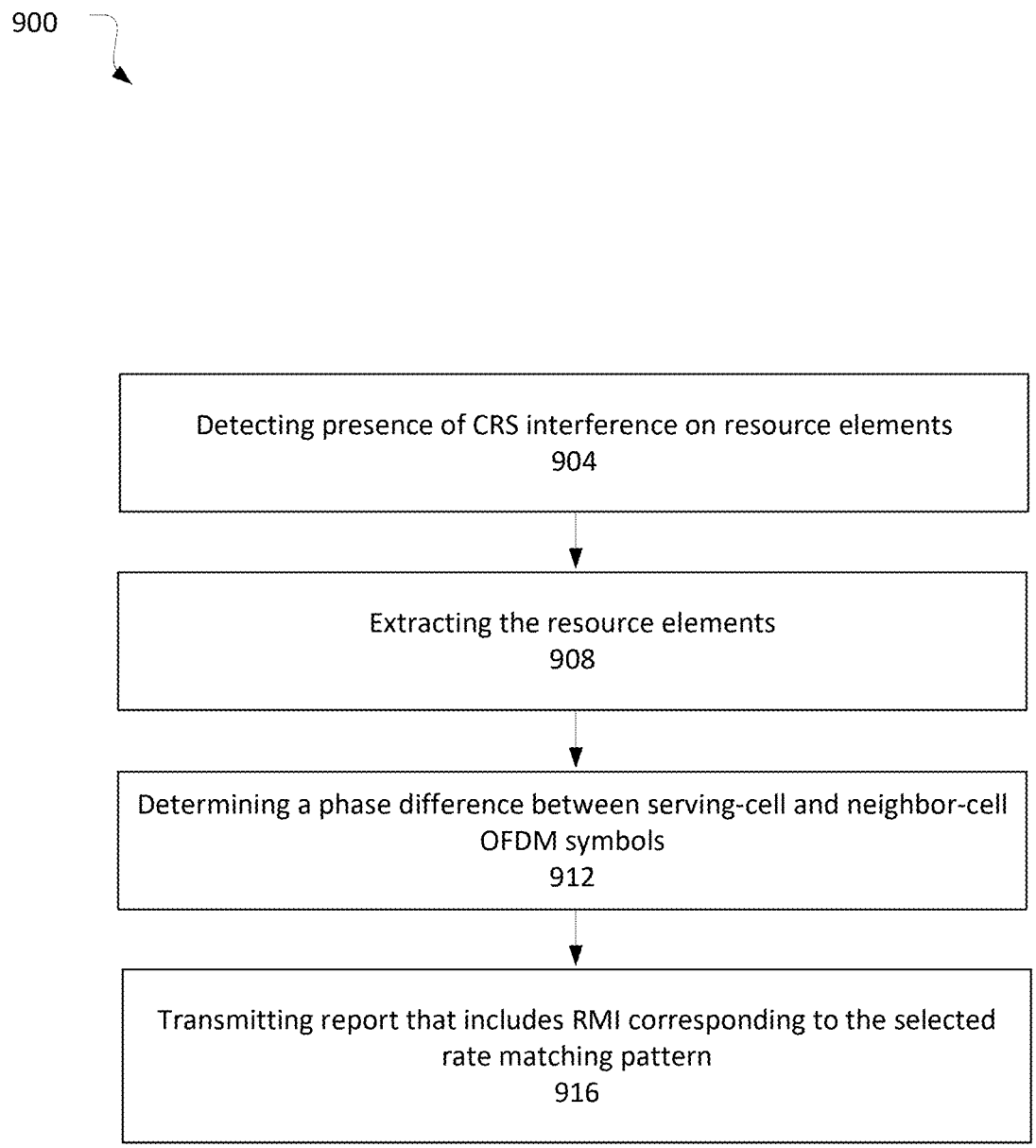
FIG. 9 illustrates another operational flow/algorithmic structure in accordance with some embodiments.

FIG. 9 illustrates an operation flow/algorithmic structure 900 in accordance with some aspects. The operation flow/algorithmic structure 900 may be performed or implemented by a UE such as, for example, NR UE 120B, NR UE 124B, or UE 1000; or components thereof, for example, baseband processor 1004A.

The operation flow/algorithmic structure 900 may include, at 904, detecting the presence of interference on resource elements of a serving-cell OFDM symbol from a CRS in a neighbor-cell OFDM symbol.

The operation flow/algorithmic structure 900 may further include, at 908, extracting the resource elements. The extraction of the resource elements may utilize an extraction pattern with a number of regions that are based on a CRS shift and a DC carrier as described elsewhere herein.

The operation flow/algorithmic structure 900 may further include, at 912, constructing the CRS by compensating for a phase difference between the serving-cell OFDM symbol in the neighbor-cell OFDM symbol. The phase difference may be based on different symbol generation techniques used for generating an OFDM symbol with NR technology and LTE technology. In some embodiments, constructing the CRS may include performing a time filtering with phase compensation to compensate for the phase difference.

In some embodiments, the time filtering may include aligning phases of a number of symbols in a TTI to a phase of a reference symbol. This may be performed by a Kalman forward filter. Subsequently, the phases may be rotated back to the original phase of respective symbols. This may be performed by a Kalman backward smooth and cancellation operation.

The operation flow/algorithmic structure 900 may further include, at 916, canceling interference in the resource elements. The interference cancellation may remove some or all of the CRS interference from the resource elements of the serving-cell OFDM symbol. The serving-cell OFDM symbol may then be written back to an OFDM symbol buffer for further processing.

Figure 10:
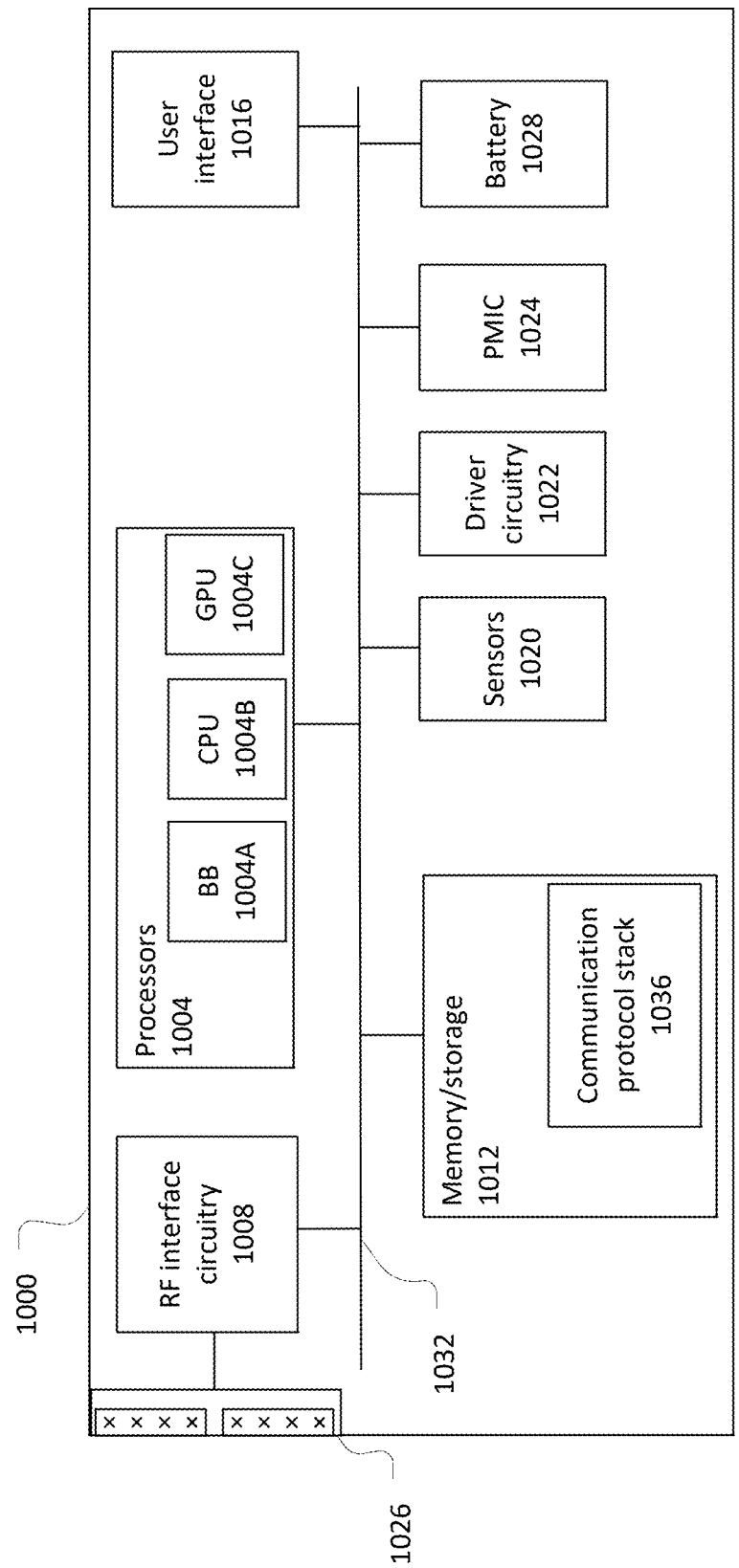
FIG. 10 illustrates a user equipment in accordance with some embodiments.

FIG. 10 illustrates a UE 1000 in accordance with some aspects. The UE 1000 may be similar to and substantially interchangeable with NR UE 120B or NR UE 124B.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some aspects, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some aspects, the PHY layer operations may additionally/alternatively be performed by the components of the RF interface circuitry 1008.

The baseband processor circuitry 1004A may generate or process baseband signals or waveforms that carry information in 3GPP-compatible networks. In some aspects, the waveforms for NR may be based cyclic prefix OFDM (CP-OFDM) in the uplink or downlink, and discrete Fourier transform spread OFDM (DFT-S-OFDM) in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 may also store CSI IMR, reporting, and rate pattern configuration information as described elsewhere.

The memory/storage 1012 include any type of volatile or non-volatile memory that may be distributed throughout the UE 1000. In some aspects, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various aspects, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in their environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1022 may include software and hardware elements that operate to control particular devices that are embedded in the UE 1000, attached to the UE 1100, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method comprising: identifying a cell identity of a neighbor cell that transmits a cell-specific reference signal (CRS); deriving a CRS shift based on the cell identity; extracting the CRS based on the CRS shift and a direct current (DC) subcarrier of a serving cell; performing a channel estimate of the CRS; and cancelling CRS interference from data received in the serving cell based on the channel estimate.

Example 2 includes the method of example 1, wherein extracting the CRS comprises: identifying an extraction pattern that includes first, second, and third regions of a carrier bandwidth of the serving cell, the first region to include a first resource block (RB) that includes the DC subcarrier, the second region to include one or more RBs on frequencies below the first RB, and the third region to include one or more RBs on frequencies above the first RB.

Example 3 includes the method of example 2, further comprising: writing the data to an orthogonal frequency division multiplexing (OFDM) symbol buffer based on the extraction pattern.

Example 4 includes the method of example 2, wherein extracting the CRS comprises: mapping CRS resource elements (REs) from the neighbor cell to corresponding REs in the second region; and mapping CRS REs to REs offset by one from corresponding REs in the third region.

Example 5 includes the method of example 4, further comprising: determining a first CRS RE is to be mapped to a first RE that is outside of the carrier bandwidth; generating a pseudo reference signal based on the first CRS RE; and performing the channel estimate based further on the pseudo reference signal.

Example 6 includes the method of example 2, wherein extracting the CRS comprises: identifying first REs in the first region that have frequencies below the DC subcarrier; identifying second REs in the second region that have frequencies above the DC subcarrier; mapping CRS REs from the neighbor cell to corresponding REs of the first REs; and mapping CRS REs from the neighbor cell to REs offset by one from corresponding REs of the second REs.

Example 7 includes the method of example 1, wherein deriving the CRS shift comprises: determining the CRS shift is equal to the cell identity modulo 6.

Example 8 includes the method of example 1, wherein a carrier bandwidth of the serving cell is greater than a carrier bandwidth of the neighbor cell.

Example 9 includes a method comprising: detecting a presence of interference on resource elements of a serving-cell orthogonal frequency division multiplexed (OFDM) symbol from a cell-specific reference signal (CRS) in a neighbor-cell OFDM symbol; extracting the resource elements; constructing the CRS by compensating for a phase difference between the serving-cell OFDM symbol and the neighbor-cell OFDM symbol; and canceling interference in the resource elements based on constructing the CRS.

Example 10 includes the method of example 9, wherein constructing the CRS comprises: descrambling the CRS and performing a frequency filtering.

Example 11 includes the method of example 9, wherein constructing the CRS comprises: performing time filtering with phase compensation to compensate the phase difference.

Example 12 includes the method of example 11, wherein performing time filtering comprises: performing Kalman forward time filtering to rotate phase of the neighbor-cell OFDM symbol to a reference OFDM symbol; and performing Kalman backward time filtering to rotate phase of the neighbor-cell back to an original phase.

Example 13 includes the method of example 11, wherein performing time filtering comprises: performing Kalman forward time filtering to rotate phase of the neighbor-cell OFDM symbol to a reference OFDM symbol; and performing Kalman backward time filtering to rotate phase of the neighbor-cell back to an original phase.

Example 14 includes the method of example 9, further comprising: receiving a neighbor cell list from a base station; identifying a cell identity of a neighbor cell based on the neighbor cell list; and deriving a CRS shift based on the cell identity.

Example 15 includes the method of example 9, wherein extracting the resource elements comprises: extracting the resource elements based on a direct current (DC) subcarrier of a serving cell.

Example 16 includes the method of example 15, wherein extracting the resource elements further comprises: identifying an extraction pattern that includes first, second, and third regions of a carrier bandwidth of the serving cell, the first region to include a first resource block (RB) that includes the DC subcarrier, the second region to include one or more RBs on frequencies below the first RB, and the third region to include one or more RBs on frequencies above the first RB.

Example 17 includes the method of example 16, wherein extracting the resource elements further comprises: mapping CRS resource elements (REs) from a neighbor cell to corresponding REs in the second region; and mapping CRS REs to REs offset by one from corresponding REs in the third region.

Example 18 includes a method of operating a user equipment (UE), the method comprising: extracting, based on a direct current (DC) subcarrier of a serving cell, a first cell-specific reference signal (CRS) symbol; extracting, based on the DC subcarrier, a second CRS symbol; and determining a frequency offset estimation between the UE and an evolved node B (eNB) that transmits CRSs that are received on the first and second CRS symbols.

Example 19 includes the method of example 18, the method further comprising: determining a phase offset that results from differences in generating a Long Term Evolution (LTE) symbol and a New Radio (NR) symbol; and generating an updated frequency offset estimation by excluding the phase offset from the frequency offset estimation.

Example 20 includes the method of example 19, further comprising: constructing CRS signals based on the updated frequency offset estimation; and removing interference from a signal of the serving cell based on the CRS signals.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media (NTCRM) having instructions that, when executed, cause processor circuitry to:
   identify a cell identity of a neighbor cell that transmits a cell-specific reference signal (CRS);
   derive a CRS shift based on the cell identity;
   identify, based on the CRS shift and a direct current (DC) subcarrier of a serving cell, an extraction pattern that includes first, second, and third regions of a carrier bandwidth of the serving cell, the first region to include a first resource block (RB) that includes the DC subcarrier, the second region to include one or more RBs on frequencies below the first RB, and the third region to include one or more RBs on frequencies above the first RB;
   extract the CRS based on the extraction pattern, wherein to extract the CRS the processor circuitry is to map first CRS resource elements (REs) from the neighbor cell to corresponding REs in the second region and map second CRS REs from the neighbor cell to REs offset by one from corresponding REs in the third region;
   perform a channel estimate of the CRS; and
   cancel CRS interference from data received in the serving cell based on the channel estimate.

2. The one or more NTCRM of claim 1, wherein the instructions, when executed, further cause the processor circuitry to:
   write the data to an orthogonal frequency division multiplexing (OFDM) symbol buffer based on the extraction pattern.

3. The one or more NTCRM of claim 1, wherein the instructions, when executed, further cause the processor circuitry to:
   determine a first CRS RE is to be mapped to a first RE that is outside of the carrier bandwidth;
   generate a pseudo reference signal based on the first CRS RE; and
   perform the channel estimate based further on the pseudo reference signal.

4. The one or more NTCRM of claim 1, wherein to extract the CRS the processor circuitry is to:
   identify first REs in the first region that have frequencies below the DC subcarrier;
   identify second REs in the second region that have frequencies above the DC subcarrier;
   map third CRS REs from the neighbor cell to corresponding REs of the first REs; and map fourth CRS REs from the neighbor cell to REs offset by one from corresponding REs of the second REs.

5. The one or more NTCRM of claim 1, wherein to derive the CRS shift the processor circuitry is to:
determine the CRS shift is equal to the cell identity modulo 6.

6. The one or more NTCRM of claim 1, wherein a carrier bandwidth of the serving cell is greater than a carrier bandwidth of the neighbor cell.

7. A method comprising:
identifying a cell identity of a neighbor cell that transmits a cell-specific reference signal (CRS);
deriving a CRS shift based on the cell identity;
identifying, based on the CRS shift and a direct current (DC) subcarrier of a serving cell, an extraction pattern that includes first, second, and third regions of a carrier bandwidth of the serving cell, the first region to include a first resource block (RB) that includes the DC subcarrier, the second region to include one or more RBs on frequencies below the first RB, and the third region to include one or more RBs on frequencies above the first RB;
extracting the CRS based on the extraction pattern, wherein extracting the CRS includes identifying first resource elements (REs) in the first region that have frequencies below the DC subcarrier; identifying second REs in the second region that have frequencies above the DC subcarrier; mapping first CRS REs from the neighbor cell to corresponding REs of the first REs; and mapping second CRS REs from the neighbor cell to REs offset by one from corresponding REs of the second REs;
performing a channel estimate of the CRS; and
canceling CRS interference from data received in the serving cell based on the channel estimate.

8. The method of claim 7, further comprising:
writing the data to an orthogonal frequency division multiplexing (OFDM) symbol buffer based on the extraction pattern.

9. The method of claim 7, wherein extracting the CRS further comprises:
mapping third CRS REs from the neighbor cell to corresponding REs in the second region; and
mapping fourth CRS REs from the neighbor cell to REs offset by one from corresponding REs in the third region.

10. The method of claim 7, further comprising:
determining a first CRS RE is to be mapped to a first RE that is outside of the carrier bandwidth;
generating a pseudo reference signal based on the first CRS RE; and
performing the channel estimate based further on the pseudo reference signal.

11. The method of claim 7, wherein deriving the CRS shift comprises:
determining the CRS shift is equal to the cell identity modulo 6.

12. The method of claim 7, wherein a carrier bandwidth of the serving cell is greater than a carrier bandwidth of the neighbor cell.

13. An apparatus comprising:
processor circuitry to:
identify a cell identity of a neighbor cell that transmits a cell-specific reference signal (CRS);
derive a CRS shift based on the cell identity;
identify, based on the CRS shift and a direct current (DC) subcarrier of a serving cell, an extraction pattern that includes first, second, and third regions of a carrier bandwidth of the serving cell, the first region to include a first resource block (RB) that includes the DC subcarrier, the second region to include one or more RBs on frequencies below the first RB, and the third region to include one or more RBs on frequencies above the first RB;
extract the CRS based on the extraction pattern, wherein to extract the CRS the processor circuitry is to map first CRS resource elements (REs) from the neighbor cell to corresponding REs in the second region and map second CRS REs from the neighbor cell to REs offset by one from corresponding REs in the third region;
perform a channel estimate of the CRS; and
cancel CRS interference from data received in the serving cell based on the channel estimate; and
interface circuitry coupled with the processor circuitry to enable communication.

14. The apparatus of claim 13, wherein the processor circuitry is further to:
write the data to an orthogonal frequency division multiplexing (OFDM) symbol buffer based on the extraction pattern.

15. The apparatus of claim 13, wherein the processor circuitry is further to:
determine a first CRS RE is to be mapped to a first RE that is outside of the carrier bandwidth;
generate a pseudo reference signal based on the first CRS RE; and
perform the channel estimate based further on the pseudo reference signal.

16. The apparatus of claim 13, wherein to extract the CRS the processor circuitry is to:
identify first REs in the first region that have frequencies below the DC subcarrier;
identify second REs in the second region that have frequencies above the DC subcarrier;
map third CRS REs from the neighbor cell to corresponding REs of the first REs; and
map fourth CRS REs from the neighbor cell to REs offset by one from corresponding REs of the second REs.

17. The apparatus of claim 13, wherein to derive the CRS shift the processor circuitry is to:
determine the CRS shift is equal to the cell identity modulo 6.

18. The apparatus of claim 13, wherein a carrier bandwidth of the serving cell is greater than a carrier bandwidth of the neighbor cell.

\* \* \* \* \*